United States Patent
Osuga et al.

(10) Patent No.: US 11,501,561 B2
(45) Date of Patent: Nov. 15, 2022

(54) OCCUPANT MONITORING DEVICE, OCCUPANT MONITORING METHOD, AND OCCUPANT MONITORING PROGRAM

(71) Applicants: AISIN CORPORATION, Kariya (JP); TOYOTA JIDOSHA KABUSHIKI KAISHA, Toyota (JP)

(72) Inventors: Shin Osuga, Nagoya (JP); Tetsuya Hattori, Kariya (JP); Yoshiyuki Yamada, Kariya (JP); Takeshi Matsumura, Toyota (JP)

(73) Assignees: AISIN CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 200 days.

(21) Appl. No.: 16/580,562

(22) Filed: Sep. 24, 2019

(65) Prior Publication Data
US 2020/0104569 A1    Apr. 2, 2020

(30) Foreign Application Priority Data
Sep. 27, 2018   (JP) .............................. JP2018-181801

(51) Int. Cl.
*G06K 9/00*  (2022.01)
*G06V 40/16*  (2022.01)
(Continued)

(52) U.S. Cl.
CPC ......... *G06V 40/166* (2022.01); *G06K 9/6256* (2013.01); *G06T 7/246* (2017.01);
(Continued)

(58) Field of Classification Search
CPC ........... G06K 9/00255; G06K 9/00241; G06K 9/00832; G06K 9/00275; G06K 9/00597;
(Continued)

(56) References Cited

U.S. PATENT DOCUMENTS 10,853,622 B2 *   12/2020   Hara .................... A61B 5/0077
2018/0032825 A1 *  2/2018   Fung ........................ G06T 7/73
(Continued)

FOREIGN PATENT DOCUMENTS

| JP | 2010-97379 A | 4/2010 |
|---|---|---|
| JP | 2018-128834 A | 8/2018 |

OTHER PUBLICATIONS

Communication dated Jul. 16, 2022 from the Japanese Patent Office in Japanese Application No. 2018-181801.

*Primary Examiner* — Dhaval V Patel
(74) *Attorney, Agent, or Firm* — Sughrue Mion, PLLC

(57) ABSTRACT

An occupant monitoring device includes: an acquisition unit that acquires a captured image obtained by imaging a region in which there is a probability that a face of an occupant is present in a vehicle; a determination unit that determines whether the captured image acquired by the acquisition unit corresponds to a first image including the face a part of which is hidden by an accessory or a second image including the face a part of which is hidden by a non-accessory object other than the accessory; and a processing unit that detects face information regarding the face of the occupant based on the captured image in different modes according to a determination result in the determination unit, and monitors a state change of the face of the occupant based on a detection result.

16 Claims, 9 Drawing Sheets

(51) Int. Cl.
   *G06T 7/246* (2017.01)
   *G06K 9/62* (2022.01)
   *G06V 20/59* (2022.01)
   *G06V 40/18* (2022.01)
   *H04L 67/12* (2022.01)

(52) U.S. Cl.
   CPC ............ *G06V 20/59* (2022.01); *G06V 40/164* (2022.01); *G06V 40/169* (2022.01); *G06V 40/174* (2022.01); *G06V 40/18* (2022.01); *G06T 2207/30201* (2013.01); *G06T 2207/30268* (2013.01); *H04L 67/12* (2013.01)

(58) Field of Classification Search
   CPC ............. G06K 9/6256; G06K 9/00302; G06K 9/00604; G06K 9/00248; G06T 7/246; G06T 2207/30268; G06T 2207/30201; H04L 67/12; H04W 4/48
   See application file for complete search history.

(56) References Cited

U.S. PATENT DOCUMENTS

| | | |
|---|---|---|
| 2018/0225532 A1 | 8/2018 | Matsumura |
| 2020/0005060 A1* | 1/2020 | Martin ................. G05D 1/0223 |

* cited by examiner

OCCUPANT MONITORING DEVICE, OCCUPANT MONITORING METHOD, AND OCCUPANT MONITORING PROGRAM

CROSS REFERENCE TO RELATED APPLICATIONS

This application is based on and claims priority under 35 U.S.C. § 119 to Japanese Patent Application 2018-181801, filed on Sep. 27, 2018, the entire contents of which are incorporated herein by reference.

TECHNICAL FIELD

This disclosure relates an occupant monitoring device, an occupant monitoring method, and an occupant monitoring program.

BACKGROUND DISCUSSION

In the related art, there is a technique in which an occupant monitoring process including detection (and tracking of detected face information) of face information regarding an occupant's face based on a captured image obtained by imaging the occupant's face of a vehicle, and thus a state change of the occupant's face is monitored. In the related art, in a case where a part of an occupant's face is hidden by an accessory such as a mask or sunglasses, an occupant monitoring process may be executed in different modes depending on an accessory wearing status.

In the related art, a situation in which a part of an occupant's face is hidden may also occur due to a non-accessory object that is not an accessory, such as the occupant's hand or a mobile phone in addition to an accessory such as a mask or sunglasses. However, in the related art, since the situation in which a part of an occupant's face is hidden by a non-accessory object is not supposed, in a case where a part of the occupant's face is hidden, the occupant monitoring process may be executed in an identical mode regardless of whether a cause of hiding is an accessory or a non-accessory object.

Here, generally, the degree of hiding of an occupant's face differs between an accessory and a non-accessory object. For example, a portion of a face hidden by an accessory is defined to be constant according to the type of accessory, but a portion of a face hidden by a non-accessory object variously changes according to the type of non-accessory object or time, and is thus hardly defined to be constant. Therefore, when the occupant monitoring process is executed in an identical mode in a case where a part of the occupant's face is hidden by an accessory and in a case where a part of the occupant's face is hidden by a non-accessory object, the accuracy of the occupant monitoring process may be reduced.

Thus, a need exists for an occupant monitoring device, an occupant monitoring method, and an occupant monitoring program which are not susceptible to the drawback mentioned above.

SUMMARY

An occupant monitoring device as an example of this disclosure includes an acquisition unit that acquires a captured image obtained by imaging a region in which there is a probability that a face of an occupant is present in a vehicle; a determination unit that determines whether the captured image acquired by the acquisition unit corresponds to a first image including the face a part of which is hidden by an accessory or a second image including the face a part of which is hidden by a non-accessory object other than the accessory; and a processing unit that detects face information regarding the face of the occupant based on the captured image in different modes according to a determination result in the determination unit, and monitors a state change of the face of the occupant based on a detection result.

The occupant monitoring device can make modes of detecting face information different in a case where a part of a face of an occupant is hidden by an accessory and a case where a part of the face of the occupant is hidden by a non-accessory object, and can thus improve the accuracy of an occupant monitoring process.

An occupant monitoring method as another example of this disclosure includes an acquisition step of acquiring a captured image obtained by imaging a region in which there is a probability that a face of an occupant is present in a vehicle; a determination step of determining whether the captured image acquired in the acquisition step corresponds to a first image including the face a part of which is hidden by an accessory or a second image including the face a part of which is hidden by a non-accessory object other than the accessory; and a processing step of detecting face information regarding the face of the occupant based on the captured image in different modes according to a determination result in the determination step, and monitoring a state change of the face of the occupant based on a detection result.

According to the occupant monitoring method, it is possible to make modes of detecting face information different in a case where a part of a face of an occupant is hidden by an accessory and a case where a part of the face of the occupant is hidden by a non-accessory object, and thus to improve the accuracy of an occupant monitoring process.

An occupant monitoring program as still another example of this disclosure causes a computer to execute an acquisition step of acquiring a captured image obtained by imaging a region in which there is a probability that a face of an occupant is present in a vehicle; a determination step of determining whether the captured image acquired in the acquisition step corresponds to a first image including the face a part of which is hidden by an accessory or a second image including the face a part of which is hidden by a non-accessory object other than the accessory; and a processing step of detecting face information regarding the face of the occupant based on the captured image in different modes according to a determination result in the determination step, and monitoring a state change of the face of the occupant based on a detection result.

According to the occupant monitoring program, it is possible to make modes of detecting face information different in a case where a part of a face of an occupant is hidden by an accessory and a case where a part of the face of the occupant is hidden by a non-accessory object, and thus to improve the accuracy of an occupant monitoring process.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of this disclosure will be described with reference to the drawings. Configurations of the embodiment described below and operations and results (effects) resulting from the configurations are only examples, and are not limited to the contents described below.

Figure 1:
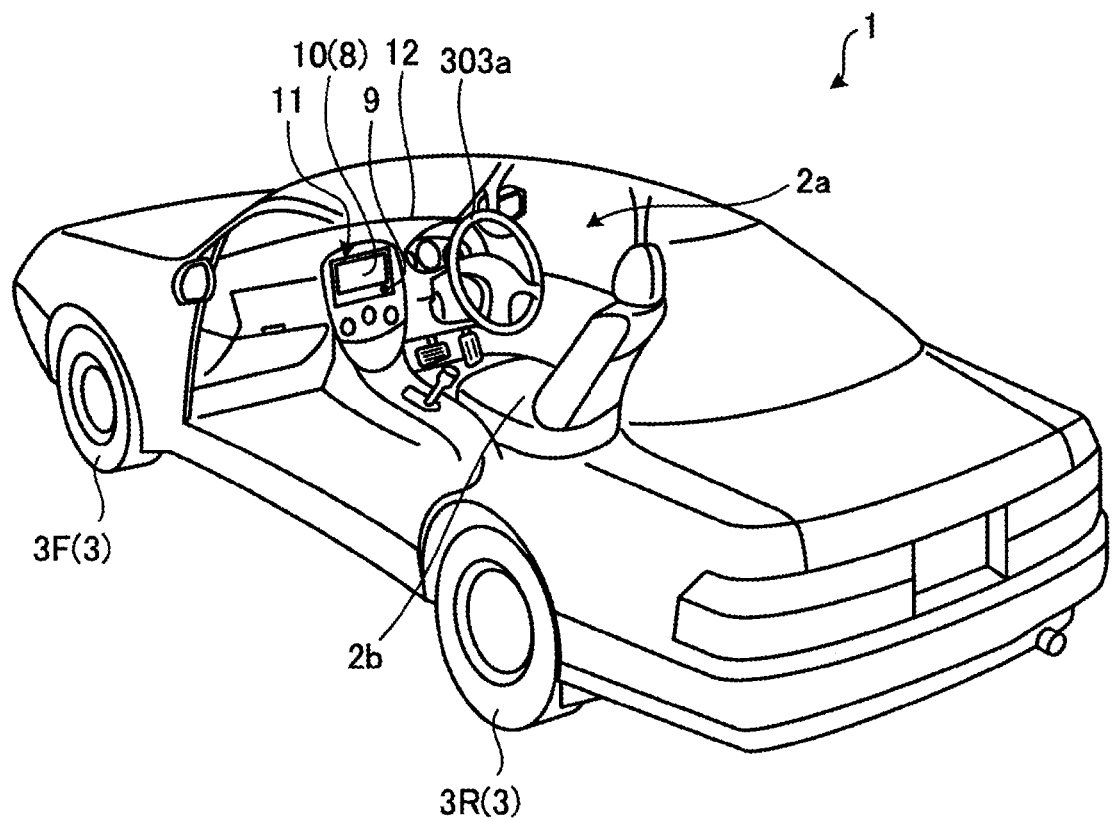
FIG. 1 is an exemplary and schematic diagram illustrating an example of a configuration of a vehicle according to an embodiment.
Figure 2:
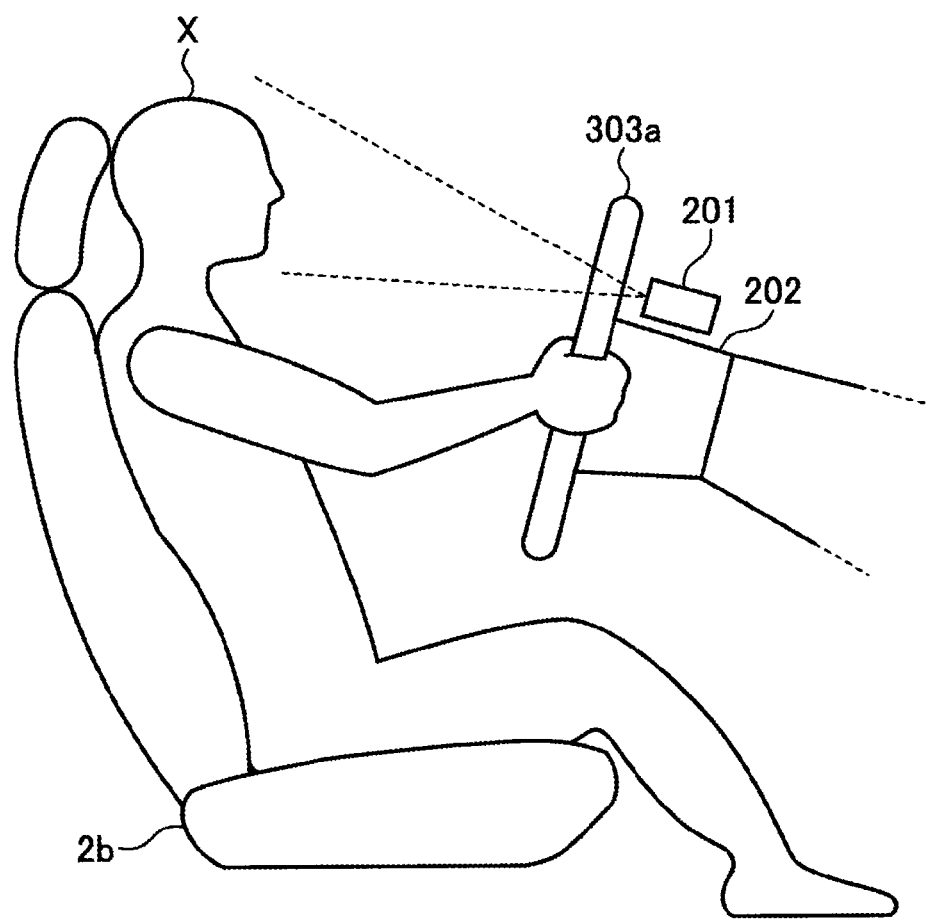
FIG. 2 is an exemplary and schematic diagram illustrating an example of disposition of an imaging device according to the embodiment.

First, with reference to FIGS. 1 and 2, a description will be made of a schematic configuration of a vehicle 1 according to an embodiment. FIG. 1 is an exemplary and schematic diagram illustrating an example of a configuration of the vehicle 1 according to the embodiment, and FIG. 2 is an exemplary and schematic diagram illustrating an example of disposition of an imaging device 201 according to the embodiment.

As illustrated in FIG. 1, the vehicle 1 according to the embodiment is a four-wheeled automobile having two left and right front wheels 3F and two left and right rear wheels 3R. Hereinafter, for simplification, the front wheels 3F and the rear wheels 3R will be referred to as vehicle wheels 3 in some cases. In the embodiment, sideslip angles of some or all of the four vehicle wheels 3 are changed (turned) in response to steering of a steering unit 303a.

As illustrated in FIG. 1, the vehicle 1 according to the embodiment has a vehicle cabin 2a in which an occupant (not illustrated in FIG. 1) rides. The steering unit 303a is provided in a state of being able to be operated by a driver X (not illustrated in FIG. 1) as an occupant on a driver's seat 2b in the vehicle cabin 2a. The steering unit 303a is configured with a steering wheel or a handle provided to protrude from a dashboard (instrument panel) 12. In the embodiment, needless to say, seats other than the driver's seat 2b may be present in the vehicle cabin 2a.

A monitor device 11 including a display unit 8 that outputs various images and a sound output unit 9 that outputs various sounds is provided in the vehicle cabin 2a. The monitor device 11 is provided, for example, at a central portion of the dashboard in a vehicle width direction (leftward-rightward direction) in the vehicle cabin 2a. In the example illustrated in FIG. 1, the display unit 8 is covered with an operation input unit 10 that detects a coordinate of a position to which an indicator such as a finger or a stylus comes close (including contact). Consequently, the occupant can visually recognize an image displayed on the display unit 8, and can input various operations by performing an input operation (for example, a touch operation) using an indicator on the operation input unit 10.

As illustrated in FIG. 2, the imaging device 201 is provided on a support portion 202 supporting the steering unit 303a. The imaging device 201 is configured with, for example, a charge coupled device (CCD) camera.

Here, in the embodiment, the imaging device 201 is configured to image a region in which there is a probability that the face of the driver X sitting on the driver's seat 2b may be present. More specifically, a viewing angle and a pose of the imaging device 201 are adjusted such that the face of the driver X sitting on the driver's seat 2b is located at the center of a visual field.

The imaging device 201 periodically executes imaging of the face of the driver X at a predetermined time interval during driving of the vehicle 1, and sequentially outputs captured images (image data corresponding thereto) obtained through the imaging to an occupant monitoring device 310 (refer to FIGS. 3 and 4) which will be described later. As will be described later in detail, the occupant monitoring device 310 executes an occupant monitoring process including detection of face information regarding the face of the driver X (and tracking of the detected face information) based on a captured image obtained through imaging in the imaging device 201, and thus monitors a state change of the face of the driver X.

Although not illustrated in FIG. 2, in the embodiment, an illumination unit that irradiates a region imaged by the imaging device 201 with light may be provided. In this case, when an infrared lamp applying infrared light is used, it is possible to assist the imaging device 201 in imaging without the driver X feeling glaring.

Hereinafter, a description will be made of an occupant monitoring process executed based on a captured image obtained by the imaging device 201 and including information regarding a region in which there is a probability that the face of the driver X sitting on the driver's seat 2b may be present, but the occupant monitoring process may be executed on an occupant other than the driver X. In other words, the occupant monitoring process may be similarly executed based on a captured image obtained by an imaging unit, installed at a position that is different from the position of the imaging device 201, imaging a region in which there is a probability that a face of an occupant sitting on a seat other than the driver's seat 2b may be present.

Next, with reference to FIG. 3, a description will be made of a configuration of an occupant monitoring system 300 including the occupant monitoring device 310 executing the occupant monitoring process. The system configuration illustrated in FIG. 3 is only an example, and is variously settable (changeable).

Figure 3:
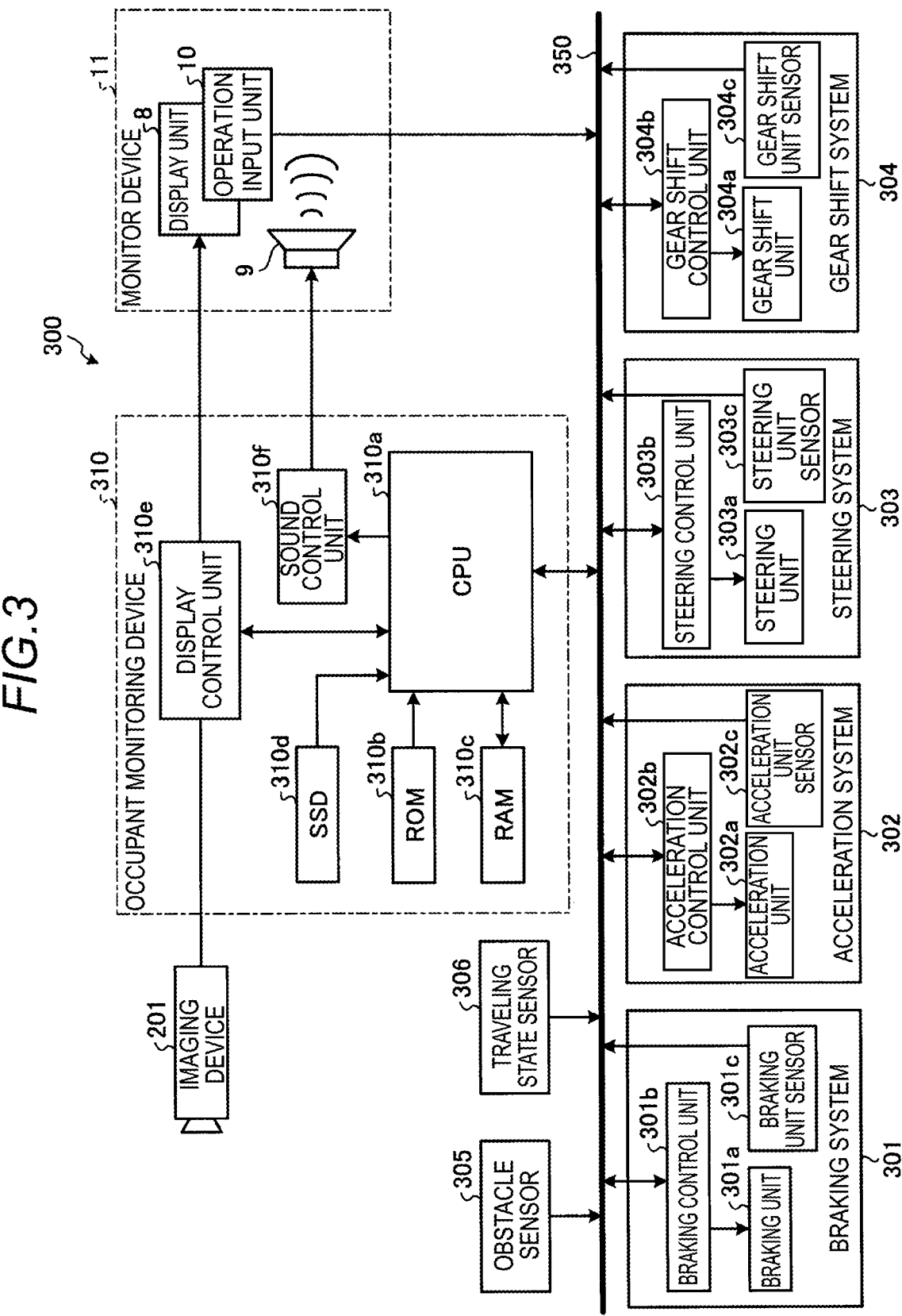
FIG. 3 is an exemplary and schematic block diagram illustrating a configuration of an occupant monitoring system according to the embodiment.

FIG. 3 is an exemplary and schematic block diagram illustrating a configuration of the occupant monitoring system 300 according to the embodiment. As illustrated in FIG. 3, the occupant monitoring system 300 includes a braking system 301, an acceleration system 302, a steering system 303, a gear shift system 304, an obstacle sensor 305, a traveling state sensor 306, the imaging device 201, the monitor device 11, the occupant monitoring device 310, and an on-vehicle network 350.

The braking system 301 controls deceleration of the vehicle 1. The braking system 301 includes a braking unit 301a, a braking control unit 301b, and a braking unit sensor 301c.

The braking unit 301a is a device used to decelerate the vehicle 1, such as a brake pedal.

The braking control unit 301b is an electronic control unit (ECU) configured with a computer having a hardware processor such as a CPU. The braking control unit 301b drives an actuator (not illustrated) based on an instruction that is input via, for example, the on-vehicle network 350, and operates the braking unit 301a to control the degree of deceleration of the vehicle 1.

The braking unit sensor 301c is a device used to detect a state of the braking unit 301a. For example, in a case where the braking unit 301a is configured with a brake pedal, the braking unit sensor 301c detects a position of the brake pedal or pressure applied to the brake pedal as a state of the braking unit 301a. The braking unit sensor 301c outputs the detected state of the braking unit 301a to the on-vehicle network 350.

The acceleration system 302 controls acceleration of the vehicle 1. The acceleration system 302 includes an acceleration unit 302a, an acceleration control unit 302b, and an acceleration unit sensor 302c.

The acceleration unit 302a is a device used to accelerate the vehicle 1, such as an accelerator pedal.

The acceleration control unit 302b is an ECU configured with a computer having a hardware processor such as a CPU. The acceleration control unit 302b drives an actuator (not illustrated) based on an instruction that is input via, for example, the on-vehicle network 350, and operates the acceleration unit 302a to control the degree of acceleration of the vehicle 1.

The acceleration unit sensor 302c is a device used to detect a state of the acceleration unit 302a. For example, in a case where the acceleration unit 302a is configured with an accelerator pedal, the acceleration unit sensor 302c detects a position of the accelerator pedal or pressure applied to the accelerator pedal. The acceleration unit sensor 302c outputs the detected state of the acceleration unit 302a to the on-vehicle network 350.

The steering system 303 controls an advancing direction of the vehicle 1. The steering system 303 includes the steering unit 303a, a steering control unit 303b, and a steering unit sensor 303c.

The steering unit 303a is a device used to turn a turning wheel of the vehicle 1, such as a steering wheel or a handle.

The steering control unit 303b is an ECU configured with a computer having a hardware processor such as a CPU. The steering control unit 303b drives an actuator (not illustrated) based on an instruction that is input via, for example, the on-vehicle network 350, and operates the steering unit 303a to control an advancing direction of the vehicle 1.

The steering unit sensor 303c is a device used to detect a state of the steering unit 303a. For example, in a case where the steering unit 303a is configured with a steering wheel, the steering unit sensor 303c detects a position of the steering wheel or a rotation angle of the steering wheel. In a case where the steering unit 303a is configured with a handle, the steering unit sensor 303c may detect a position of the handle or pressure applied to the handle. The steering unit sensor 303c outputs the detected state of the steering unit 303a to the on-vehicle network 350.

The gear shift system 304 controls a gear ratio of the vehicle 1. The gear shift system 304 includes a gear shift unit 304a, a gear shift control unit 304b, and a gear shift unit sensor 304c.

The gear shift unit 304a is a device used to change a gear ratio of the vehicle 1, such as a shift lever.

The gear shift control unit 304b is an ECU configured with a computer having a hardware processor such as a CPU. The gear shift control unit 304b drives an actuator (not illustrated) based on an instruction that is input via, for example, the on-vehicle network 350, and operates the gear shift unit 304a to control a gear ratio of the vehicle 1.

The gear shift unit sensor 304c is a device used to detect a state of the gear shift unit 304a. For example, in a case where the gear shift unit 304a is configured with a shift lever, the gear shift unit sensor 304c detects a position of the shift lever or pressure applied to the shift lever. The gear shift unit sensor 304c outputs the detected state of the gear shift unit 304a to the on-vehicle network 350.

The obstacle sensor 305 is a device used to detect information regarding an obstacle that may be present on the periphery of the vehicle 1. The obstacle sensor 305 includes a ranging sensor such as a sonar detecting a distance to an obstacle. The obstacle sensor 305 outputs the detected information to the on-vehicle network 350.

The traveling state sensor 306 is a device used to detect a traveling state of the vehicle 1. The traveling state sensor 306 includes, for example, a vehicle wheel sensor detecting a wheel speed of the vehicle 1, an acceleration sensor detecting acceleration of the vehicle 1 in a front-rear direction or a leftward-rightward direction, or a gyro sensor detecting a turning speed (angular velocity) of the vehicle 1. The traveling state sensor 306 outputs the detected traveling state to the on-vehicle network 350.

The occupant monitoring device 310 is a device integrally controlling the occupant monitoring system 300. The occupant monitoring device 310 executes an occupant monitoring process including detection of face information regarding the face of the driver X (and tracking of the detected face information) based on a captured image obtained by the imaging device 201, and thus monitors a state change of the face of the driver X.

The occupant monitoring device 310 is configured with an ECU including a central processing unit (CPU) 310a, a read only memory (ROM) 310b, a random access memory (RAM) 310c, a solid state drive (SSD) 310d, a display control unit 310e, and a sound control unit 310f.

The CPU 310a is a hardware processor integrally controlling the occupant monitoring device 310. The CPU 310a reads various control programs (computer programs) stored in the ROM 310b or the like, and realizes various functions according to instructions defined in the various control programs. The various control programs include an occupant monitoring program for realizing an occupant monitoring process.

The ROM 310b is a nonvolatile main storage device storing parameters or the like required to execute the various control programs.

The RAM 310c is a volatile main storage device providing a work area of the CPU 310a.

The SSD 310d is a rewritable nonvolatile auxiliary storage device. In the occupant monitoring device 310 according to the embodiment, as an auxiliary storage device, a hard disk drive (HDD) may be provided instead of the SSD 310d (or in addition to the SSD 310d).

Among various processes executed by the occupant monitoring device 310, the display control unit 310e mainly executes image processing on a captured image obtained from the imaging device 201 or generates image data to be output to the display unit 8 of the monitor device 11.

Among various processes executed by the occupant monitoring device 310, the sound control unit 310f mainly generates sound data to be output to the sound output unit 9 of the monitor device 11.

The on-vehicle network 350 communicably connects the braking system 301, the acceleration system 302, the steering system 303, the gear shift system 304, the obstacle sensor 305, the traveling state sensor 306, the operation input unit 10 of the monitor device 11, and the occupant monitoring device 310 to each other.

Meanwhile, there is a technique in which, in a case where a part of an occupant's face is hidden by an accessory such as a mask or sunglasses, an occupant monitoring process is executed in different modes depending on a wearing status of the accessory.

In the related art, a situation in which a part of an occupant's face is hidden may also occur due to a non-accessory object that is not an accessory, such as the occupant's hand or a mobile phone in addition to an accessory such as a mask or sunglasses. However, in the related art, since the situation in which a part of an occupant's face is hidden by a non-accessory object is not supposed, in a case where a part of the occupant's face is hidden, the occupant monitoring process may be executed in an identical mode regardless of whether a cause of hiding is an accessory or a non-accessory object.

Here, generally, the degree of hiding of an occupant's face differs between an accessory and a non-accessory object. For example, a portion of a face hidden by an accessory is defined to be constant according to the type of accessory, but a portion of a face hidden by a non-accessory object variously changes according to the type of non-accessory object or time, and is thus hardly defined to be constant. Therefore, when the occupant monitoring process is executed in an identical mode in a case where a part of the occupant's face is hidden by an accessory and in a case where a part of the occupant's face is hidden by a non-accessory object, the accuracy of the occupant monitoring process may be reduced.

Figure 4:
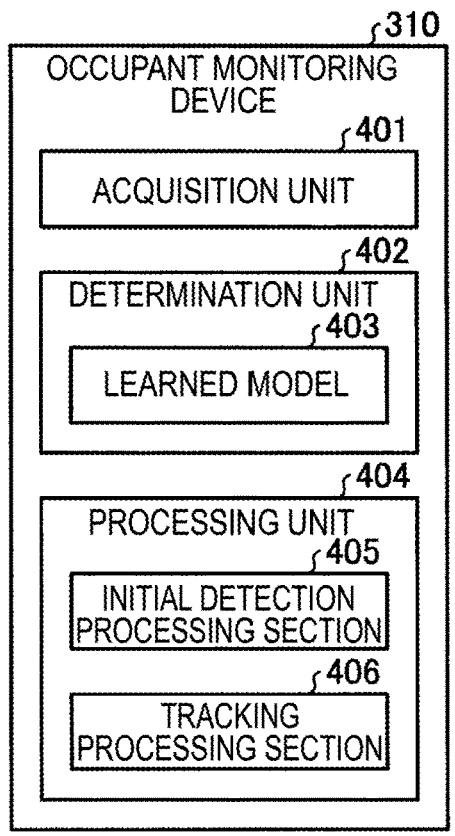
FIG. 4 is an exemplary and schematic block diagram illustrating functions of an occupant monitoring device according to the embodiment.

Therefore, in the embodiment, the occupant monitoring device 310 has functions as illustrated in FIG. 4, and thus the accuracy of the occupant monitoring process is improved.

FIG. 4 is an exemplary and schematic block diagram illustrating functions of the occupant monitoring device 310 according to the embodiment. The functions illustrated in FIG. 4 are realized through cooperation between software and hardware. In other words, in the example illustrated in FIG. 4, the functions of the occupant monitoring device 310 are realized as a result of the CPU 310a reading and executing a predetermined control program stored in the ROM 310b. In the embodiment, at least some of the functions illustrated in FIG. 4 may be realized by dedicated hardware (circuit).

As illustrated in FIG. 4, the occupant monitoring device 310 according to the embodiment includes an acquisition unit 401, a determination unit 402, and a processing unit 404.

The acquisition unit 401 successively acquires captured images obtained by the imaging device 201 a plurality of times at predetermined control timings. As described above, the captured image includes information regarding a region in which there is a probability that the face of the driver X may be present in the vehicle 1.

The determination unit 402 determines whether the captured image obtained by the acquisition unit 401 corresponds to of a first image including a face a part of which is hidden by an accessory such as a mask or sunglasses, a second image including a face a part of which is hidden by a non-accessory object such as a hand or a mobile phone other than an accessory, or a third image including the whole face not hidden by an accessory or a non-accessory object.

More specifically, the determination unit 402 has a learned model 403 generated as a result of machine learning, and determines whether the captured image corresponds to any one of the first image, the second image, or the third image based on the learned model 403. The learned model 403 may be generated through, for example, supervised learning in which labels respectively corresponding to the first image, the second image, and the third image are added to a plurality of learning images, and combinations of the learning images and the labels are used as training data. The learning image is assumed to be an image captured under the same condition as, for example, that of a captured image, and to include information similar to that of the captured image. In the embodiment, machine learning for generating the learned model 403 is not limited to supervised learning, and may be unsupervised learning, reinforcement learning, or a combination of one or more of the three learning schemes.

Here, a description will be briefly made of specific examples of the first image, the second image, and the third image.

Figure 5:
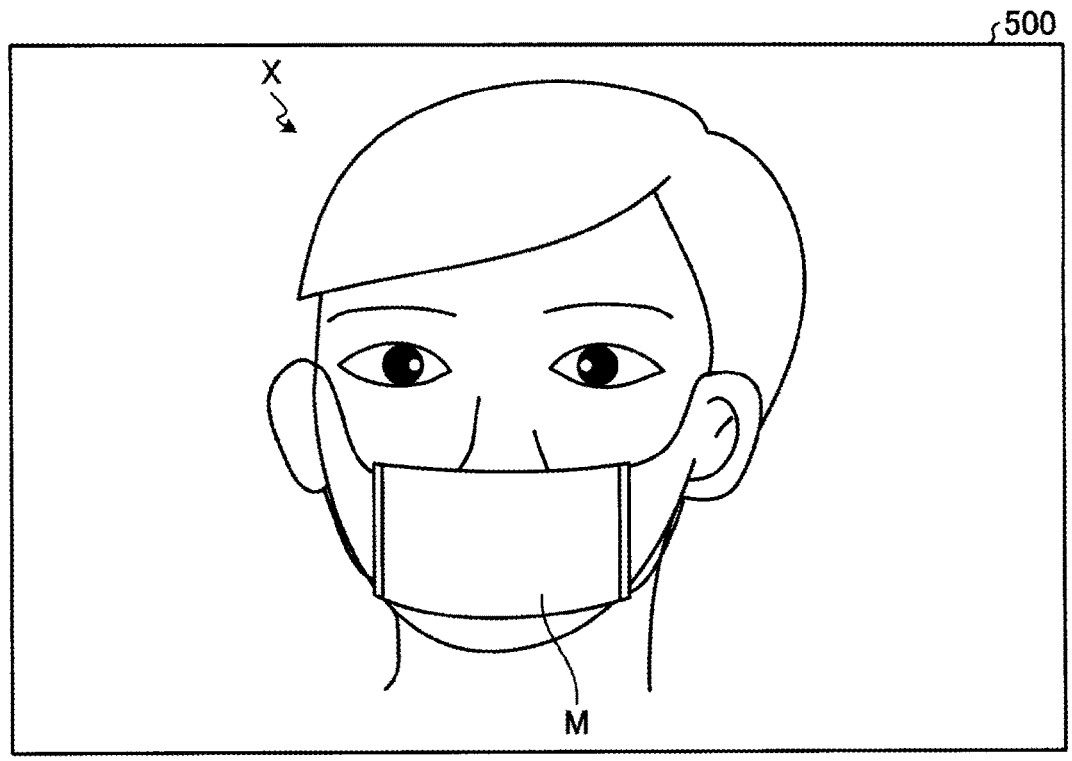
FIG. 5 is an exemplary and schematic diagram illustrating an example of a first image according to the embodiment.

FIG. 5 is an exemplary and schematic diagram illustrating an example of the first image according to the embodiment. An image 500 illustrated in FIG. 5 represents a situation in which a part of the face of the driver X is hidden by an accessory, and is thus an example of the first image. More specifically, the image 500 represents a situation in which the mouth of the face of the driver X is hidden by a mask M as an accessory. The mask M is an accessory, and is thus maintained at a constant position until being removed.

Figure 6:
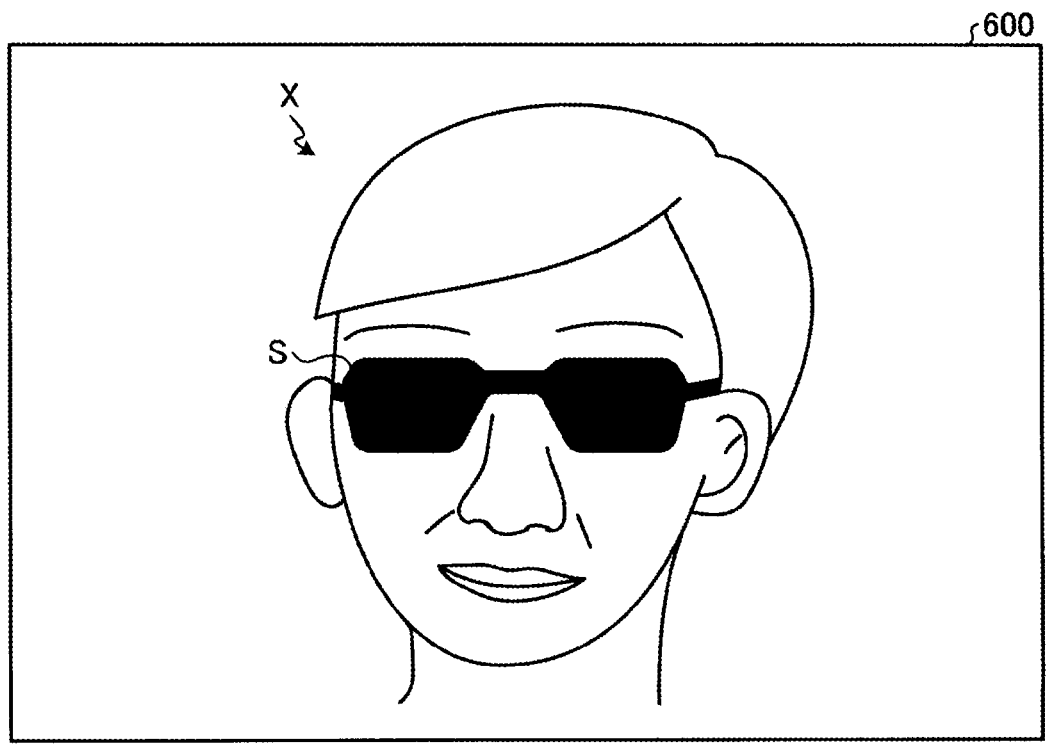
FIG. 6 is an exemplary and schematic diagram illustrating another example of the first image according to the embodiment.

FIG. 6 is an exemplary and schematic diagram illustrating another example of the first image according to the embodiment. In the same manner as the image 500 illustrated in FIG. 5, an image 600 illustrated in FIG. 6 also represents a situation in which a part of the face of the driver X is hidden by an accessory, and is thus an example of the first image. More specifically, the image 600 represents a situation in which the eyes of the face of the driver X are hidden by sunglasses S as an accessory. In the same manner as the mask M (refer to FIG. 5), the sunglasses S are an accessory, and are thus maintained at a constant position until being removed.

Figure 7:
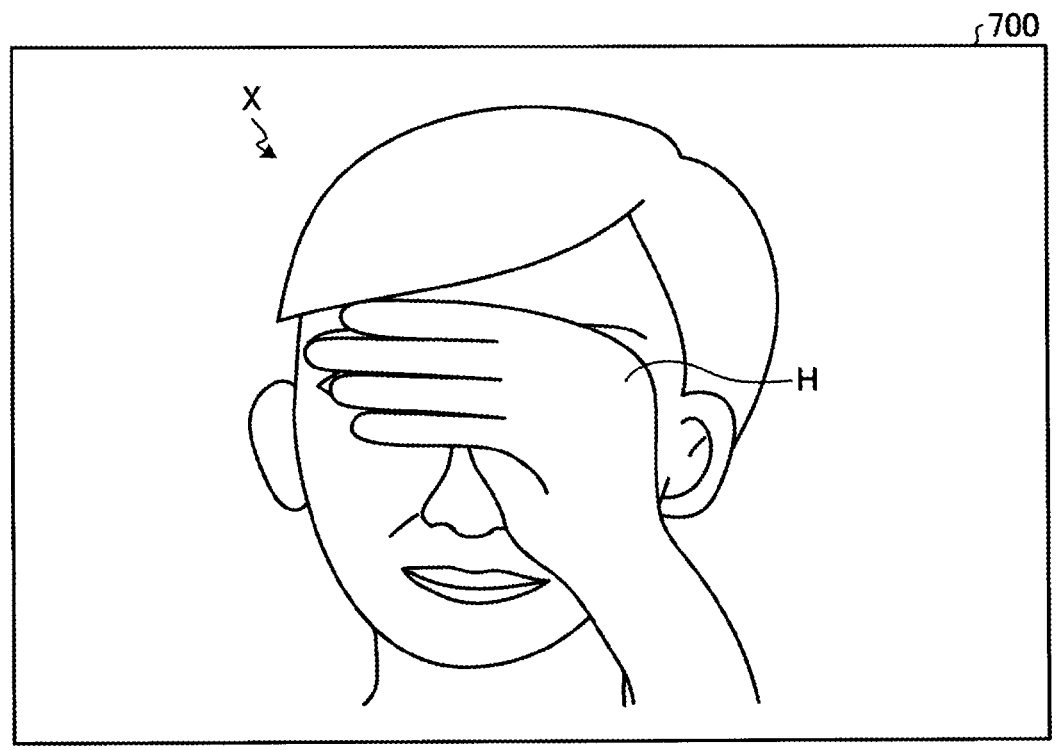
FIG. 7 is an exemplary and schematic diagram illustrating an example of a second image according to the embodiment.

FIG. 7 is an exemplary and schematic diagram illustrating an example of the second image according to the embodiment. An image 700 illustrated in FIG. 7 represents a situation in which a part of the face of the driver X is hidden by a non-accessory object, and is thus an example of the second image. More specifically, the image 700 represents a situation in which the eye and the cheek of the driver X are hidden by the hand H as a non-accessory object. In the example illustrated in FIG. 7, the hand H overlaps portions corresponding to the eye and the cheek of the driver X, but the hand H is a non-accessory object, and thus does not normally overlap a specific position of the face, so that the hand H is hardly maintained at a constant position.

Figure 8:
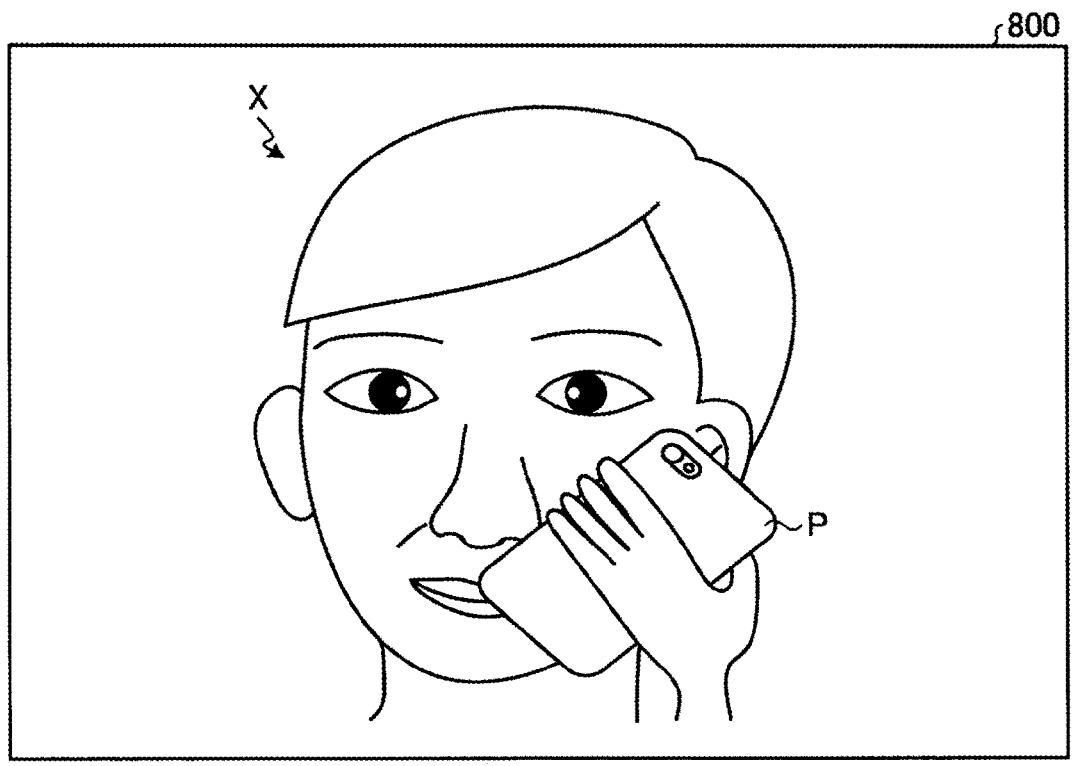
FIG. 8 is an exemplary and schematic diagram illustrating another example of the second image according to the embodiment.

FIG. 8 is an exemplary and schematic diagram illustrating another example of the second image according to the embodiment. In the same manner as the image 700 illustrated in FIG. 7, an image 800 illustrated in FIG. 8 also represents a situation in which a part of the face of the driver X is hidden by a non-accessory object, and is thus an example of the second image. More specifically, the image 800 represents a situation in which a part of the face of the driver X is hidden by a mobile phone P as a non-accessory object. In the example illustrated in FIG. 8, the mobile phone overlaps portions from the ear to the mouth of the driver X, but the mobile phone P is a non-accessory object, and thus does not normally overlap a specific position of the face in the same manner as the hand H (refer to FIG. 7), so that the mobile phone P is hardly maintained at a constant position.

Figure 9:
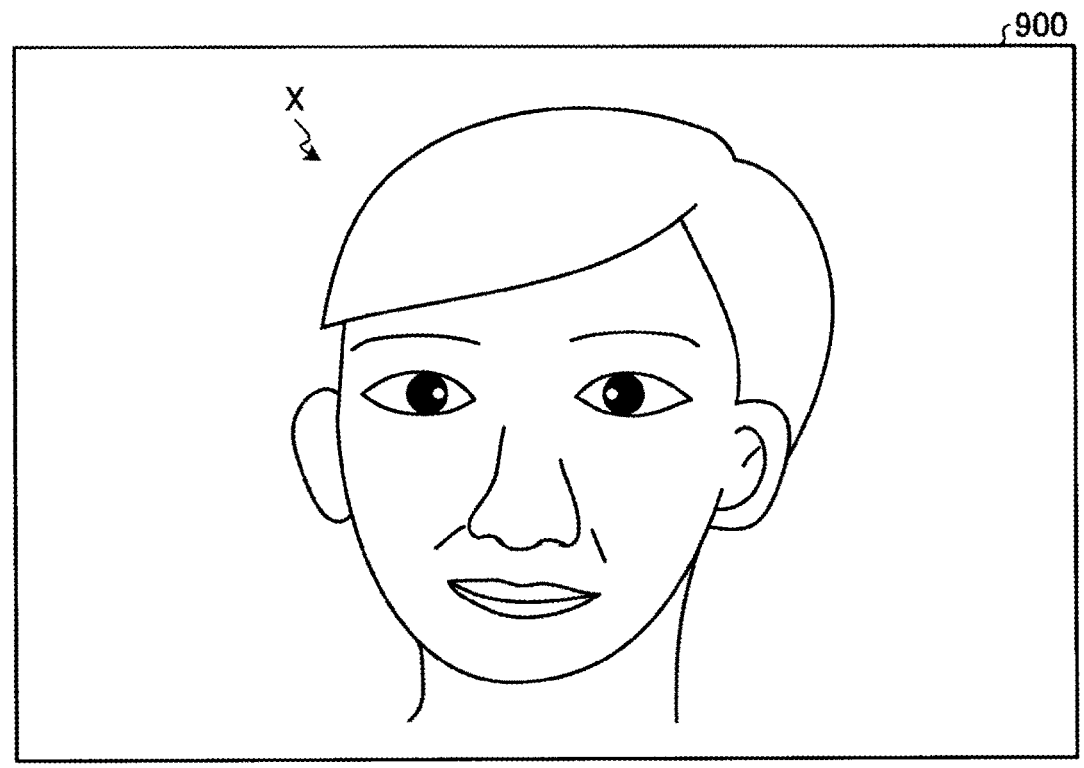
FIG. 9 is an exemplary and schematic diagram illustrating an example of a third image according to the embodiment.

FIG. 9 is an exemplary and schematic diagram illustrating an example of the third image according to the embodiment. An image 900 illustrated in FIG. 9 represents a situation in which the whole face of the driver X is exposed, and is thus an example of the third image.

The occupant monitoring process according to the embodiment is executed based on face information regarding the face of the driver X, acquired from various captured images as illustrated in FIGS. 5 to 9. The face information is data including eye information regarding the eye of the driver X, mouth information regarding the mouth of the driver X, and expression information regarding an expression of the driver X. The eye information is data indicating an opening or closing state of the eye (eyelid) or a direction of a visual line. The mouth information is data indicating an opening or closing state (conversation state) of the mouth.

Here, all pieces of face information can be stably acquired from the third image (hereinafter, referred to as a normal image in some cases for convenience) such as the image 900 illustrated in FIG. 9. Therefore, all pieces of face information are preferably focused in the normal image.

From the first image such as the images 500 and 600 illustrated in FIGS. 5 and 6, information regarding a portion of a face not hidden by an accessory can be stably acquired, but information regarding a portion of a face hidden by the accessory cannot be acquired. Therefore, in the first image, preferably, the latter information is not focused, and only the former information is focused.

More specifically, from the first image (hereinafter, referred to as a mask image in some cases for convenience) such as the image 500 illustrated in FIG. 5, eye information can be stably acquired but mouth information cannot be acquired. Therefore, the eye information is preferably focused in the mask image.

From the first image (hereinafter, referred to as a sunglasses image in some cases for convenience) such as the image 600 illustrated in FIG. 6, mouth information can be stably acquired but eye information cannot be acquired. Therefore, only the mouth information is preferably focused in the sunglasses image.

On the other hand, it is difficult to stably acquire specific face information from the second image (hereinafter, referred to as a hiding image in some cases) such as images 700 and 800 illustrated in FIGS. 7 and 8. That is, as described above, since a non-accessory object does not normally overlap a specific position of a face, and is thus hardly maintained at a constant position, information omission tends to occur in a case where only a specific portion of the face is focused. Therefore, in the hiding image, in a case where at least face information is acquired for the first time as an initial step of the occupant monitoring process, it is preferable that all pieces of face information are focused instead of focusing on only specific face information.

The expression information may be acquired in a certain level as long as the whole face is not hidden. Therefore, the expression information is preferably focused in any one of the various images as illustrated in FIGS. 5 to 9.

As mentioned above, face information to be focused differs in a situation in which a part of a face is hidden by an accessory, a situation in which a part of a face is hidden by a non-accessory object, and a situation in which the whole face is exposed. Therefore, the occupant monitoring process is preferably executed in different modes depending on situations such that face information to be focused is appropriately changed depending on the situations.

Therefore, referring to FIG. 4 again, the processing unit 404 detects face information regarding the face of the driver X in different modes according to a determination result in the determination unit 402, and monitors a state change of the face of the driver X based on a detection result. Hereinafter, the functions of the processing unit 404 will be described in more detail.

The processing unit 404 has functional modules respectively corresponding to two control modes such as an initial detection mode of detecting face information from a captured image for the first time as an initial step of the occupant monitoring process and a tracking mode of tracking of the face information detected in the initial detection process.

In other words, the processing unit 404 includes an initial detection processing section 405 executing an initial detection process as a process corresponding to the initial detection mode, and a tracking processing section 406 executing a tracking process as a process corresponding to the tracking mode.

A control mode of the processing unit 404 is set to the initial detection mode, for example, in a case where the acquisition unit 401 acquires a captured image.

As described above, in a case where a captured image corresponds to the first image such as the mask image illustrated in FIG. 5 or the sunglasses image illustrated in FIG. 6, information regarding a specific portion of a face, that is, a portion of the face not hidden by an accessory is preferably focused. Therefore, in the embodiment, in a case where a captured image corresponds to the first image, the initial detection processing section 405 of the processing unit 404 detects face information based on one or more feature points corresponding to the portion of the face not hidden by the accessory among a plurality of feature points set in advance for the whole face.

On the other hand, as described above, in a case where a captured image corresponds to the second image such as the hiding image illustrated in FIGS. 7 and 8, in at least the initial detection process, all pieces of face information are preferably focused. Therefore, in the embodiment, in a case where a captured image corresponds to the second image, the initial detection processing section 405 of the processing unit 404 detects face information based on (all of) a plurality of feature points set in advance for the whole face.

However, in a case where a portion of the face hidden by a non-accessory object includes the eye, it is useless to detect eye information as face information, and, in a case where a portion of the face hidden by a non-accessory object includes the mouth, it is useless to detect mouth information as face information.

Therefore, in a case where a captured image corresponds to the second image, the initial detection processing section 405 of the processing unit 404 detects separate face information according to a portion of the face hidden by a non-accessory object. More specifically, the initial detection processing section 405 of the processing unit 404 detects eye information as face information in a case where a portion of the face hidden by a non-accessory object does not include the eye, and detects mouth information as face information in a case where a portion of the face hidden by a non-accessory object does not include the mouth.

Here, as described above, since a non-accessory object does not normally overlap a specific position of a face, and is thus hardly maintained at a constant position, a situation in which neither eye information nor mouth information is acquired may occur in a case where a captured image corresponds to the second image. However, as described above, expression information may be acquired in a certain level as long as the whole face is not hidden. Thus, even though a situation in which neither eye information nor mouth information is acquired occurs in a case where a captured image corresponds to the second image, expression information may be acquired in a certain level.

Therefore, in the embodiment, in a case where a captured image corresponds to the second image, the initial detection processing section 405 of the processing unit 404 detects expression information regarding an expression as face information regardless of whether or not detection of eye information and mouth information is successful.

In the embodiment, in a case where a captured image corresponds to the third image such as the normal image illustrated in FIG. 9, needless to say, the initial detection processing section 405 of the processing unit 404 detects (all pieces of) face information based on (all of) a plurality of feature points set in advance for the whole face.

Here, the face information may be detected in a certain level based on only feature points acquired from a captured image. However, the face information may be detected in more detail by using fitting between feature points acquired from a captured image and a three-dimensional model acquired as data representing a structure including a three-dimensional shape of a face. The fitting is a process of appropriately adjusting parameters representing a three-dimensional model to match a structure including a shape of a face in a captured image.

In the embodiment, in a case where a captured image corresponds to the first image or the third image, feature points to be focused are constant, and thus the fitting can be easily executed. However, in a case where a captured image corresponds to the second image, feature points to be focused are not constant, and thus it is difficult to execute the fitting.

Therefore, the initial detection processing section 405 of the processing unit 404 detects face information based on a result of fitting between feature points acquired from the first image and a three-dimensional model representing a structure including a three-dimensional shape of a face of an occupant, in the embodiment, in a case where a captured image corresponds to the first image, and detects face information based on only feature points acquired from the second image in a case where a captured image corresponds to the second image.

However, in order to monitor a state change of a face, preferably, the initial detection processing section 405 detects face information as described above, and then the tracking processing section 406 executes tracking of the face information. Therefore, a control mode of the processing unit 404 fundamentally transitions to the tracking mode after detection of the face information in the initial detection mode is completed.

However, in a case where a captured image corresponds to the second image, face information to be focused is not defined, and thus it is difficult to execute tracking of face information. Therefore, in the embodiment, in a case where a captured image corresponds to the second image, the processing unit 404 causes the initial detection processing section 405 to detect face information again in different modes according to a determination result in the determination unit 402 with respect to a captured image acquired by the acquisition unit 401 at the next control timing, without causing the tracking processing section 406 to execute tracking of face information after the initial detection processing section 405 detects the face information.

On the other hand, in a case where a captured image corresponds to the first image, face information to be focused is defined to information regarding a portion of a face not hidden by an accessory, and thus tracking of the face information can be executed with no problem. Therefore, in the embodiment, in a case where a captured image corresponds to the first image, the processing unit 404 causes the initial detection processing section 405 to detect face information, and then causes the tracking processing section 406 to execute tracking of the face information.

Hereinafter, detailed contents of the initial detection process and the tracking process according to the embodiment will be described with reference to flowcharts.

First, the initial detection process will be described in detail.

Figure 10:
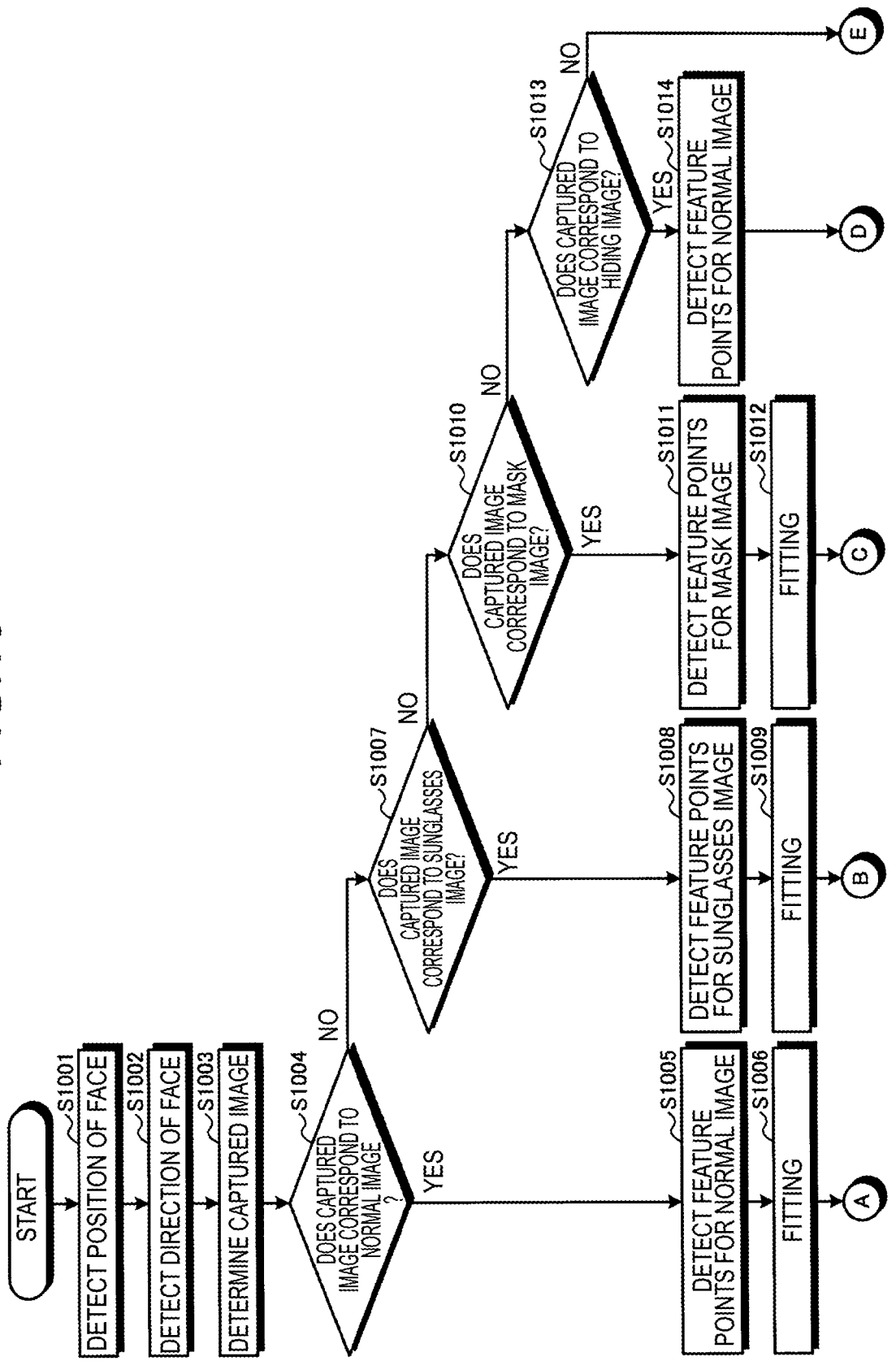
FIG. 10 is an exemplary and schematic flowchart illustrating a part of an initial detection process executed by the occupant monitoring device according to the embodiment.
Figure 11:
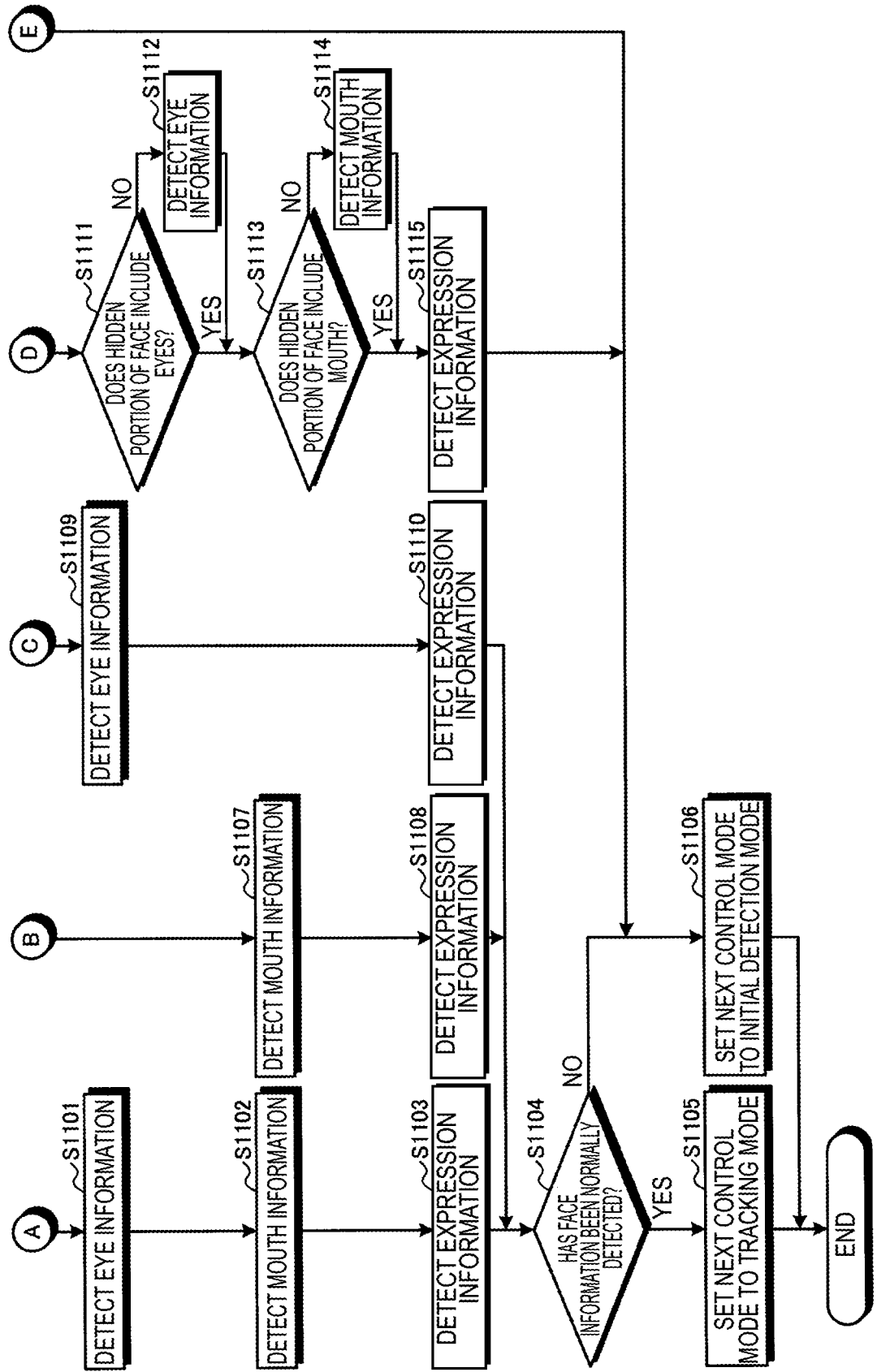
FIG. 11 is an exemplary and schematic flowchart illustrating the other initial detection process executed by the occupant monitoring device according to the embodiment.

FIG. 10 is an exemplary and schematic flowchart illustrating a part of an initial detection process executed by the occupant monitoring device 310 according to the embodiment, and FIG. 11 is an exemplary and schematic flowchart illustrating the other initial detection process executed by the occupant monitoring device 310 according to the embodiment. The initial detection process is executed, for example, in a case where a control mode of the processing unit 404 is set to the initial detection mode, and a captured image is acquired by the acquisition unit 401.

As illustrated in FIG. 10, in the initial detection process, first, in S1001, the initial detection processing section 405 detects a position of a face in the captured image.

In S1002, the initial detection processing section 405 detects a direction of the face in the captured image.

In S1003, the determination unit 402 determines the captured image.

In S1004, the initial detection processing section 405 determines whether or not the captured image corresponds to the third image, more specifically, a normal image as illustrated in FIG. 9 based on a determination result in S1002.

In a case where it is determined that the captured image corresponds to the normal image in S1004, the process proceeds to S1005. In S1005, the initial detection processing section 405 detects feature points for the normal image, that is, (all of) a plurality of feature points set in advance for the whole face, from the captured image.

In S1006, the initial detection processing section 405 executes fitting between the captured image and a three-dimensional model acquired as data representing a structure including a three-dimensional shape of the face based on the feature points detected in S1004, and detects the position and the direction of the face included in the captured image in more detail. The fitting in the initial detection process is executed based on, for example, an initial model set in advance as statistical data representing a structure including a three-dimensional shape of a face.

As illustrated in FIG. 11, in S1101, the initial detection processing section 405 detects eye information regarding the eye as face information regarding the face based on a result of the fitting in S1006. As described above, the eye information is data indicating an opening or closing state of the eye (eyelid) or a direction of a visual line.

In S1102, the initial detection processing section 405 detects mouth information regarding the mouth as the face information regarding the face. As described above, the mouth information is data indicating an opening or closing state (conversation state) of the mouth.

In S1103, the initial detection processing section 405 detects expression information regarding an expression as the face information regarding the face.

In S1104, the initial detection processing section 405 determines whether or not the face information has been normally detected. For example, the initial detection processing section 405 calculates a value (score) indicating reliability of each of the processes in S1005, S1006, and S1101 to S1103 as a series of processes recently executed in order to detect the face information, and executes the determination in S1104 based on the score.

In a case where it is determined that the face information has been normally detected in S1104, the process proceeds to S1105. In S1105, the initial detection processing section 405 sets the next control mode of the processing unit 404 to the tracking mode. The process is finished.

On the other hand, in a case where it is determined that the face information has not been normally detected in S1104, the process proceeds to S1106. In S1106, the initial detection processing section 405 sets the next control mode of the processing unit 404 to the initial detection mode. The process is finished.

Referring to FIG. 10 again, in a case where it is determined that the captured image does not correspond to the normal image in S1004, the process proceeds to S1007. In S1007, the initial detection processing section 405 determines whether or not the captured image corresponds to a sunglasses image as illustrated in FIG. 6 as the first image based on a determination result in S1002.

In a case where it is determined that the captured image corresponds to the sunglasses image in S1007, the process proceeds to S1008. In S1008, the initial detection processing section 405 detects feature points for the sunglasses image, that is, feature points corresponding to a portion of the face (a portion except the eyes) not hidden among a plurality of feature points set in advance for the whole face, from the captured image.

In S1009, the initial detection processing section 405 executes fitting between the captured image and a three-dimensional model acquired as data representing a structure including a three-dimensional shape of the face based on the feature points detected in S1008, and detects the position and the direction of the face included in the captured image in more detail.

As illustrated in FIG. 11, in S1107, the initial detection processing section 405 detects mouth information regarding the mouth as face information regarding the face based on a result of the fitting in S1009.

In S1108, the initial detection processing section 405 detects expression information regarding an expression as the face information regarding the face.

In a case where the process in S1108 is completed, the process proceeds to S1104, but the processes in S1104 and the subsequent steps have already been described, and thus a description thereof will be omitted here.

Referring to FIG. 10 again, in a case where it is determined that the captured image does not correspond to the sunglasses image in S1007, the process proceeds to S1010. In S1010, the initial detection processing section 405 determines whether or not the captured image corresponds to a mask image as illustrated in FIG. 5 as the first image based on a determination result in S1002.

In a case where it is determined that the captured image corresponds to the mask image in S1010, the process proceeds to S1011. In S1008, the initial detection processing section 405 detects feature points for the mask image, that is, feature points corresponding to a portion of the face (a portion except the mouth) not hidden among a plurality of feature points set in advance for the whole face, from the captured image.

In S1012, the initial detection processing section 405 executes fitting between the captured image and a three-dimensional model acquired as data representing a structure including a three-dimensional shape of the face based on the feature points detected in S1011, and detects the position and the direction of the face included in the captured image in more detail.

As illustrated in FIG. 11, in S1109, the initial detection processing section 405 detects eye information regarding the eye as face information regarding the face based on a result of the fitting in S1012.

In S1110, the initial detection processing section 405 detects expression information regarding an expression as the face information regarding the face.

In a case where the process in S1110 is completed, the process proceeds to S1104, but the processes in S1104 and the subsequent steps have already been described, and thus a description thereof will be omitted here.

Referring to FIG. 10 again, in a case where it is determined that the captured image does not correspond to the mask image in S1010, the process proceeds to S1013. In S1013, the initial detection processing section 405 determines whether or not the captured image corresponds to the second image, more specifically, a hiding image as illustrated in FIGS. 7 and 8 based on a determination result in S1002.

In a case where it is determined that the captured image does not correspond to the hiding image in S1013, the initial detection process is required to be executed again. Therefore, in this case, as illustrated in FIG. 11, the process proceeds to S1106, and, in S1106, the next control mode of the processing unit 404 is set to the initial detection mode. The process is finished.

In a case where it is determined that the captured image corresponds to the hiding image in S1013, the process proceeds to S1014. In S1014, the initial detection processing section 405 detects feature points for a normal image, that is, (all of) a plurality of feature points set in advance for the whole face, from the captured image.

As described above, in a case where a captured image corresponds to a hiding image, fitting based on a three-dimensional model is not executed. Therefore, in the embodiment, even though the process in S1014 is completed, the fitting such as the process in S1006, S1009, or S1012 is not executed.

As illustrated in FIG. 11, in S1111, the initial detection processing section 405 determines whether or not a portion of the face hidden by a non-accessory object includes the eye based on the feature points detected in S1014.

In a case where it is determined that the hidden portion of the face does not include the eye in S1111, the process proceeds to S1112. In this case, since it may be determined that at least eye information regarding the eye is detectable as face information regarding the face, the initial detection processing section 405 detects eye information in S1112. The process proceeds to S1113.

In a case where it is determined that the hidden portion of the face includes the eye in S1111, it may be determined that it is difficult to detect eye information, and thus the process proceeds to S1113 without executing the process in S1112.

In S1113, the initial detection processing section 405 determines whether or not a portion of the face hidden by the non-accessory object includes the mouth based on the feature points detected in S1014.

In a case where it is determined that the hidden portion of the face does not include the mouth in S1113, the process proceeds to S1114. In this case, since it may be determined that at least mouth information regarding the mouth is detectable as face information regarding the face, the initial detection processing section 405 detects mouth information in S1114. The process proceeds to S1115.

In a case where it is determined that the hidden portion of the face includes the mouth, it may be determined that it is difficult to detect mouth information in S1113, and thus the process proceeds to S1115 without executing the process in S1114.

In S1115, the initial detection processing section 405 detects expression information regarding an expression as the face information regarding the face.

In a case where the process in S1115 is completed, the process proceeds to S1106, but the processes in S1106 and the subsequent steps have already been described, and thus a description thereof will be omitted here.

Next, the tracking process will be described in detail.

Figure 12:
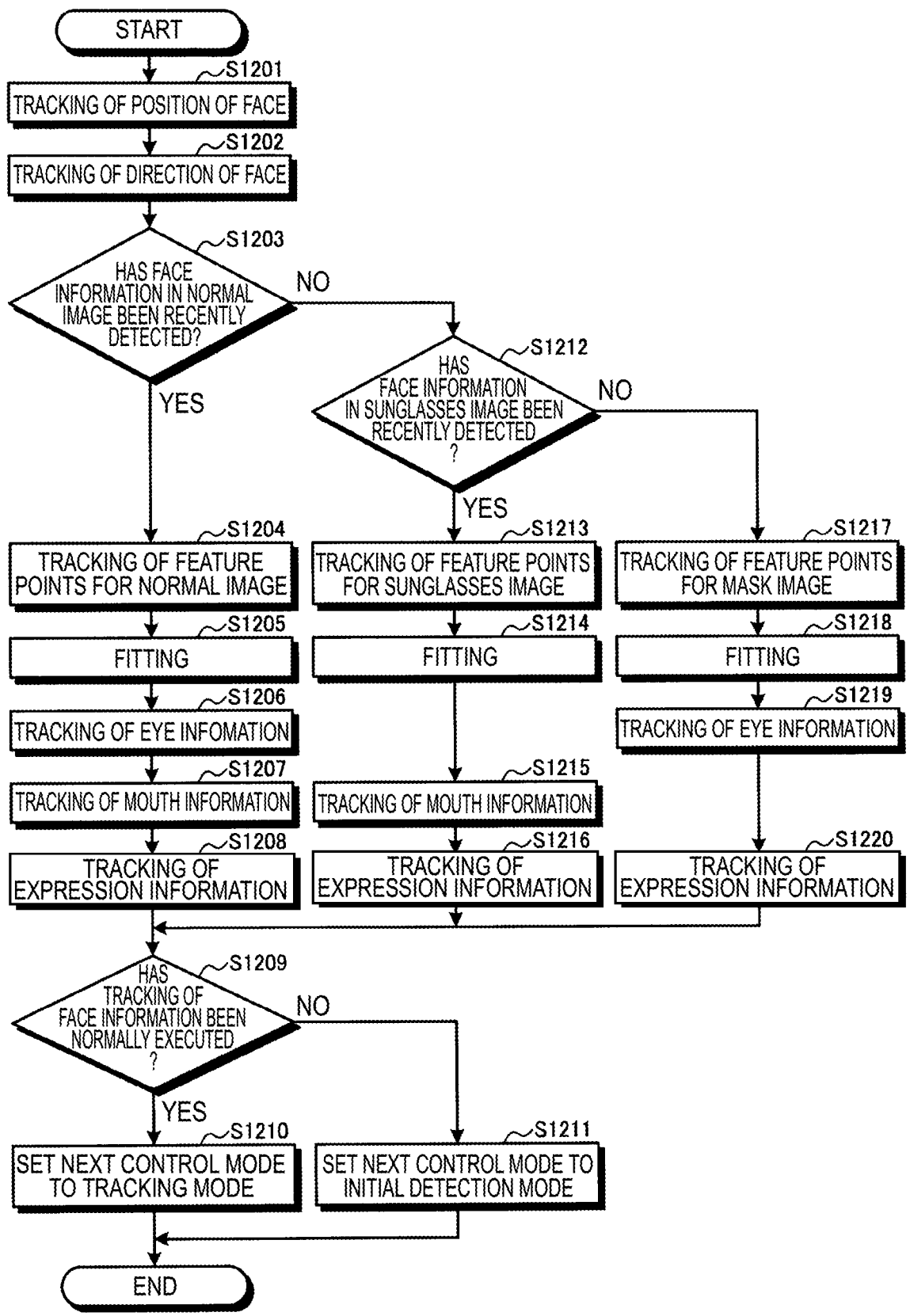
FIG. 12 is an exemplary and schematic flowchart illustrating a tracking process executed by the occupant monitoring device according to the embodiment.

FIG. 12 is an exemplary and schematic flowchart illustrating a tracking process executed by the occupant monitoring device 310 according to the embodiment. The tracking process is executed, for example, in a case where a control mode of the processing unit 404 is set to the tracking mode, and a captured image is acquired by the acquisition unit 401.

As illustrated in FIG. 12, in the tracking process, first, in S1201, the tracking processing section 406 executes tracking of a position of a face in the captured image. The tracking may be used to restrict a retrieval range, to use a template for matching, or to specify a changed portion based on a difference between consecutive frames, by using the various detection results in the initial detection process. Therefore, generally, the tracking is higher in processing speed than various detections in the initial detection process.

In S1202, the tracking processing section 406 executes tracking of a direction of the face in the captured image.

In S1203, the tracking processing section 406 determines whether or not face information in a normal image has been recently detected (including tracking).

In S1203, in a case where it is determined that the face information in the normal image has been recently detected, the process proceeds to S1204. In S1204, the tracking processing section 406 executes tracking of feature points for the normal image.

In S1205, the tracking processing section 406 executes fitting between a result of the tracking in S1204 and a three-dimensional model. The fitting in the tracking process is executed, for example, based on the latest three-dimensional model after being adjusted in the previous initial detection process or tracking process.

In S1206, the tracking processing section 406 executes tracking of eye information based on a result of the fitting in S1205.

In S1207, the tracking processing section 406 executes tracking of mouth information based on the result of the fitting in S1205.

In S1208, the tracking processing section 406 executes tracking of expression information based on the result of the fitting in S1205.

In S1209, the tracking processing section 406 determines whether or not the tracking of the face information has been normally executed. For example, the tracking processing section 406 calculates a value (score) indicating reliability of each of the processes recently executed in order to track the face information, and executes the determination in S1209 based on the score.

In a case where it is determined that tracking of the face information has been normally executed in S1209, the process proceeds to S1210. In S1210, the tracking processing section 406 sets the next control mode of the processing unit 404 to the tracking mode. The process is finished.

On the other hand, in a case where it is determined that tracking of the face information has not been normally executed in S1209, the process proceeds to S1211. In S1211, the tracking processing section 406 sets the next control mode of the processing unit 404 to the initial detection mode. The process is finished.

In a case where it is determined that the face information in the normal image has not been recently detected in S1203, the process proceeds to S1212. In S1212, the tracking processing section 406 determines whether or not face information in a sunglasses image has been recently detected (including tracking).

In a case where it is determined that the face information in the sunglasses image has been recently detected in S1212, the process proceeds to S1213. In S1213, the tracking processing section 406 executes tracking of feature points for the sunglasses image.

In S1214, the tracking processing section 406 executes fitting between a result of the tracking in S1213 and a recently used three-dimensional model.

In S1215, the tracking processing section 406 executes tracking of mouth information based on a result of the fitting in S1214.

In S1216, the tracking processing section 406 executes tracking of expression information based on the result of the fitting in S1214.

In a case where the process in S1216 is completed, the process proceeds to S1209, but the processes in S1209 and the subsequent steps have already been described, and thus a description thereof will be omitted here.

On the other hand, in a case where it is determined that the face information in the sunglasses image has not been recently detected in S1212, the process proceeds to S1217. This case corresponds to a case where face information in a mask image has been recently detected (including tracking). Therefore, in S1217, the tracking processing section 406 executes tracking of feature points for the mask image.

In S1218, the tracking processing section 406 executes fitting between a result of the tracking in S1217 and a recently used three-dimensional model.

In S1219, the tracking processing section 406 executes tracking of eye information based on a result of the fitting in S1218.

In S1220, the tracking processing section 406 executes tracking of expression information based on the result of the fitting in S1218.

In a case where the process in S1220 is completed, the process proceeds to S1209, but the processes in S1209 and the subsequent steps have already been described, and thus a description thereof will be omitted here.

As described above, the occupant monitoring device 310 according to the embodiment includes the acquisition unit 401, the determination unit 402, and the processing unit 404. The acquisition unit 401 acquires a captured image obtained by imaging a region in which there is a probability that the face of the driver X may be present in the vehicle 1. The determination unit 402 determines whether the captured image acquired by the acquisition unit 401 corresponds to the first image including the face a part of which is hidden by an accessory or the second image including the face a part of which is hidden by a non-accessory object. The processing unit 404 detects face information regarding the face of the driver X based on the captured image in different modes according to a determination result in the determination unit 402, and monitors a state change of the face of the driver X based on a detection result.

The occupant monitoring device 310 according to the embodiment can make modes of detecting face information different in a case where a part of the face of the driver X is hidden by an accessory and a case where a part of the face of the driver X is hidden by a non-accessory object, and can thus improve the accuracy of the occupant monitoring process.

In the occupant monitoring device 310 according to the embodiment, the processing unit 404 detects face information based on one or more feature points corresponding to a portion of the face not hidden by the accessory among a plurality of feature points set in advance for the whole face in a case where the determination unit 402 determines that the captured image corresponds to the first image, and detects the face information based on a plurality of feature points in a case where the determination unit 402 determines that the captured image corresponds to the second image. According to this configuration, in the former case where a portion of a face to be focused is easily defined to be constant, face information can be appropriately detected by selectively taking into consideration specific feature points corresponding to a specific portion, and, in the latter case where a portion of a face to be focused is hardly defined to be constant, face information can be appropriately detected by taking into consideration all of a plurality of feature points corresponding to the whole face.

In the occupant monitoring device 310 according to the embodiment, the processing unit 404 detects different pieces of face information according to portions of the face hidden by a non-accessory object in a case where the determination unit 402 determines that a captured image corresponds to the second image. According to this configuration, face information can be appropriately detected according to a state in which a face is hidden by a non-accessory object.

In the occupant monitoring device 310 according to the embodiment, the processing unit 404 detects eye information regarding the eye as face information in a case where a portion of a face hidden by a non-accessory object does not include the eye, and detects mouth information as face information in a case where a portion of the face hidden by the non-accessory object does not include the mouth. According to this configuration, information regarding a portion of a face not hidden by a non-accessory object can be appropriately detected as face information.

In the occupant monitoring device 310 according to the embodiment, the processing unit 404 detects expression information regarding an expression as face information regardless of whether or not detection of eye information and mouth information is successful. According to this configuration, even in a case where eye information and mouth information are not detected, at least expression information can be detected.

In the occupant monitoring device 310 according to the embodiment, the processing unit 404 detects face information based on a result of fitting between a feature of the first image and a three-dimensional model representing a structure including a three-dimensional shape of a face of an occupant in a case where the determination unit 402 determines that a captured image corresponds to the first image, and detects face information based on only a feature of the second image in a case where the determination unit 402 determines that the captured image corresponds to the second image. According to this configuration, face information can be detected in an appropriate mode depending on a situation through switching of execution of fitting depending on a situation.

In the occupant monitoring device 310 according to the embodiment, the acquisition unit 401 successively acquires captured images a plurality of times. The processing unit 404 detects face information and then executes tracking of the face information in a case where the determination unit 402 determines that a captured image corresponds to the first image, and detects face information in different modes according to a determination result in the determination unit 402 with respect to a captured image acquired next by the acquisition unit 401 without executing tracking of the face information after detecting the face information in a case where the determination unit 402 determines that the captured image corresponds to the second image. According to this configuration, it can be appropriately switched whether or not tracking is to be executed in the former case where a portion of a face to be focused is easily defined to be constant and thus tracking is easily executed and in the latter case where a portion of a face to be focused is hardly defined to be constant and thus tracking is hardly executed.

In the occupant monitoring device 310 according to the embodiment, the determination unit 402 determines whether a captured image acquired by the acquisition unit 401 corresponds to the first image or the second image based on a learning image including the information similar to the captured image and the learned model 403 generated by learning whether the learning image corresponds to the first image or the second image through machine learning. According to this configuration, it is possible to easily determine a captured image based on the learned model 403.

An occupant monitoring program executed in the occupant monitoring device 310 according to the embodiment may be provided or distributed via a network such as the Internet. In other words, the occupant monitoring program executed in the occupant monitoring device 310 according to the embodiment may be provided in a form of being downloaded via a network in a state of being stored on a computer connected to the network such as the Internet.

In the embodiment, two types of images such as a mask image and a sunglasses image are exemplified as examples of the first image. However, in the embodiment, as the first image, in addition to the two types of images, a mask-sunglasses image representing a state in which a part of a face is hidden by both a mask and sunglasses. Determination of whether or not a captured image corresponds to a mask-sunglasses image may be executed, for example, before the processing proceeds to S1007 after it is determined that the captured image does not correspond to a normal image in the process in S1004 illustrated in FIG. 10. In a case where it is determined that the captured image corresponds to the mask-sunglasses image, for example, the process proceeds to S1106 illustrated in FIG. 11, and the next control mode of the processing unit 404 is set to the initial detection mode. However, in this case, a learned model used to determine a captured image is required to be generated as a model enabling five types of images such as a normal image, a mask image, a sunglasses image, a mask-sunglasses image, and a hiding image to be determined.

In the occupant monitoring device, in a case where the determination unit determines that the captured image corresponds to the first image, the processing unit may detect the face information based on one or more feature points corresponding to a portion of the face not hidden by the accessory among a plurality of feature points set in advance for the whole face, and, in a case where the determination unit determines that the captured image corresponds to the second image, the processing unit may detect the face information based on the plurality of feature points. According to this configuration, in the former case where a portion of a face to be focused is easily defined to be constant, face information can be appropriately detected by selectively taking into consideration specific feature points corresponding to a specific portion, and, in the latter case where a portion of a face to be focused is hardly defined to be constant, face information can be appropriately detected by taking into consideration all of a plurality of feature points corresponding to the whole face.

In the occupant monitoring device, in a case where the determination unit determines that the captured image corresponds to the second image, the processing unit may detect separate face information according to a portion of the face hidden by the non-accessory object. According to this configuration, face information can be appropriately detected according to a state in which a face is hidden by a non-accessory object.

In this case, the processing unit may detect eye information regarding an eye as the face information in a case where the portion of the face hidden by the non-accessory object does not include the eye, and detect mouth information regarding a mouth as the face information in a case where the portion of the face hidden by the non-accessory object does not include the mouth. According to this configuration, information regarding a portion of a face not hidden by a non-accessory object can be appropriately detected as face information.

In this case, the processing unit may detect expression information regarding an expression as the face information regardless of whether or not detection of the eye information and the mouth information is successful. According to this configuration, even in a case where eye information and mouth information are not detected, at least expression information can be detected.

In the occupant monitoring device, in a case where the determination unit determines that the captured image corresponds to the first image, the processing unit may detect the face information based on a result of fitting between a feature of the first image and a three-dimensional model representing a structure including a three-dimensional shape of the face of the occupant, and, in a case where the determination unit determines that the captured image corresponds to the second image, the processing unit may detect the face information based on only a feature of the second image. According to this configuration, face information can be detected in an appropriate mode depending on a situation through switching of execution of fitting depending on a situation.

In the occupant monitoring device, the acquisition unit may successively acquire the captured image a plurality of times, in a case where the determination unit determines that the captured image corresponds to the first image, the processing unit may detect the face information and then executes tracking of the face information, and, in a case where the determination unit determines that the captured image corresponds to the second image, the processing unit may detect the face information and then detect the face information in different modes according to a determination result in the determination unit with respect to the captured image acquired next by the acquisition unit without executing tracking of the face information. According to this configuration, it can be appropriately switched whether or not tracking is to be executed in the former case where a portion of a face to be focused is easily defined to be constant and thus tracking is easily executed and in the latter case where a portion of a face to be focused is hardly defined to be constant and thus tracking is hardly executed.

In the occupant monitoring device, the determination unit may determine whether the captured image acquired by the acquisition unit corresponds to the first image or the second image based on a learned model generated by learning a learning image including information similar to the captured image and whether the learning image corresponds to the first image or the second image through machine learning. According to this configuration, it is possible to easily determine a captured image based on a learned model.

As mentioned above, the embodiment of this disclosure has been described, but the embodiment is only an example, and is not intended to limit the scope of the invention. The novel embodiment can be implemented in various forms, and various omissions, replacements, and changes may occur within the scope without departing from the concept of the invention. The embodiment and modifications thereof fall within the scope or the concept of the invention, and also fall within the invention disclosed in the claims and the equivalents thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An occupant monitoring device comprising:
a processor configured to implement:
an acquisition unit that acquires a captured image obtained by imaging a region in which there is a probability that a face of an occupant is present in a vehicle;
a determination unit that determines whether the captured image acquired by the acquisition unit corresponds to a first image including the face a part of which is hidden by an accessory or a second image including the face a part of which is hidden by a non-accessory object other than the accessory; and
a processing unit that detects face information regarding the face of the occupant based on the captured image in different modes according to a determination result in the determination unit, and monitors a state change of the face of the occupant based on a detection result,
wherein
in a case where the determination unit determines that the captured image corresponds to the first image, the processing unit detects the face information based on one or more feature points corresponding to a portion of the face not hidden by the accessory among a plurality of feature points set in advance for the whole face, and in a case where the determination unit determines that the captured image corresponds to the second image, the processing unit detects the face information based on the plurality of feature points.

2. The occupant monitoring device according to claim 1, wherein in a case where the determination unit determines that the captured image corresponds to the second image, the processing unit detects separate face information according to a portion of the face hidden by the non-accessory object.

3. The occupant monitoring device according to claim 2, wherein the processing unit detects eye information regarding an eye as the face information in a case where the portion of the face hidden by the non-accessory object does not include the eye, and detects mouth information regarding a mouth as the face information in a case where the portion of the face hidden by the non-accessory object does not include the mouth.

4. The occupant monitoring device according to claim 3, wherein the processing unit detects expression information regarding an expression as the face information regardless of whether or not detection of the eye information and the mouth information is successful.

5. The occupant monitoring device according to claim 1, wherein in a case where the determination unit determines that the captured image corresponds to the first image, the processing unit detects the face information based on a result of fitting between a feature of the first image and a three-dimensional model representing a structure including a three-dimensional shape of the face of the occupant, and in a case where the determination unit determines that the captured image corresponds to the second image, the processing unit detects the face information based on only a feature of the second image.

6. The occupant monitoring device according to claim 1, wherein the acquisition unit successively acquires the captured image a plurality of times, in a case where the determination unit determines that the captured image corresponds to the first image, the processing unit detects the face information and then executes tracking of the face information, and in a case where the determination unit determines that the captured image corresponds to the second image, the processing unit detects the face information and then detects the face information in different modes according to a determination result in the determination unit with respect to the captured image acquired next by the acquisition unit without executing tracking of the face information.

7. The occupant monitoring device according to claim 1, wherein the determination unit determines whether the captured image acquired by the acquisition unit corresponds to the first image or the second image based on a learned model generated by learning a learning image including information similar to the captured image and whether the learning image corresponds to the first image or the second image through machine learning.

8. An occupant monitoring method comprising:

an acquisition step of acquiring a captured image obtained by imaging a region in which there is a probability that a face of an occupant is present in a vehicle;

a determination step of determining whether the captured image acquired in the acquisition step corresponds to a first image including the face a part of which is hidden by an accessory or a second image including the face a part of which is hidden by a non-accessory object other than the accessory; and a processing step of detecting face information regarding the face of the occupant based on the captured image in different modes according to a determination result in the determination step, and monitoring a state change of the face of the occupant based on a detection result, wherein in a case where the determination step determines that the captured image corresponds to the first image, the processing step detects the face information based on one or more feature points corresponding to a portion of the face not hidden by the accessory among a plurality of feature points set in advance for the whole face, and in a case where the determination step determines that the captured image corresponds to the second image, the processing step detects the face information based on the plurality of feature points.

9. An occupant monitoring program stored on a non-transitory computer readable medium configured to cause a computer to execute:

an acquisition step of acquiring a captured image obtained by imaging a region in which there is a probability that a face of an occupant is present in a vehicle;

a determination step of determining whether the captured image acquired in the acquisition step corresponds to a first image including the face a part of which is hidden by an accessory or a second image including the face a part of which is hidden by a non-accessory object other than the accessory; and a processing step of detecting face information regarding the face of the occupant based on the captured image in different modes according to a determination result in the determination step, and monitoring a state change of the face of the occupant based on a detection result, wherein in a case where the determination step determines that the captured image corresponds to the first image, the processing step detects the face information based on one or more feature points corresponding to a portion of the face not hidden by the accessory among a plurality of feature points set in advance for the whole face, and in a case where the determination step determines that the captured image corresponds to the second image, the processing step detects the face information based on the plurality of feature points.

10. The occupant monitoring device according to claim 1, wherein in a case where the determination unit determines that the captured image corresponds to the second image, the processing unit detects separate face information according to a portion of the face hidden by the non-accessory object.

11. The occupant monitoring device according to claim 1, wherein in a case where the determination unit determines that the captured image corresponds to the first image, the processing unit detects the face information based on a result of fitting between a feature of the first image and a three-dimensional model representing a structure including a three-dimensional shape of the face of the occupant, and in a case where the determination unit determines that the captured image corresponds to the second image, the processing unit detects the face information based on only a feature of the second image.

12. The occupant monitoring device according to claim 1, wherein the acquisition unit successively acquires the captured image a plurality of times, in a case where the determination unit determines that the captured image corresponds to the first image, the processing unit detects the face information and then executes tracking of the face information, and in a case where the determination unit determines that the captured image corresponds to the second image, the processing unit detects the face information and then detects the face information in different modes according to a determination result in the determination unit with respect to the captured image acquired next by the acquisition unit without executing tracking of the face information.

13. The occupant monitoring device according to claim 1, wherein the determination unit determines whether the captured image acquired by the acquisition unit corresponds to the first image or the second image based on a learned model generated by learning a learning image including information similar to the captured image and whether the learning image corresponds to the first image or the second image through machine learning.

14. The occupant monitoring device according to claim 2, wherein in a case where the determination unit determines that the captured image corresponds to the first image, the processing unit detects the face information based on a result of fitting between a feature of the first image and a three-dimensional model representing a structure including a three-dimensional shape of the face of the occupant, and in a case where the determination unit determines that the captured image corresponds to the second image, the processing unit detects the face information based on only a feature of the second image.

15. The occupant monitoring device according to claim 2, wherein the acquisition unit successively acquires the captured image a plurality of times, in a case where the determination unit determines that the captured image corresponds to the first image, the processing unit detects the face information and then executes tracking of the face information, and in a case where the determination unit determines that the captured image corresponds to the second image, the processing unit detects the face information and then detects the face information in different modes according to a determination result in the determination unit with respect to the captured image acquired next by the acquisition unit without executing tracking of the face information.

16. The occupant monitoring device according to claim 2, wherein the determination unit determines whether the captured image acquired by the acquisition unit corresponds to the first image or the second image based on a learned model generated by learning a learning image including information similar to the captured image and whether the learning image corresponds to the first image or the second image through machine learning.

* * * * *